United States Patent [19]

Taneda

[11] Patent Number: 5,375,236
[45] Date of Patent: Dec. 20, 1994

[54] DOWN LINE-LOADING START CONTROL SYSTEM

[75] Inventor: Koichi Taneda, Tokyo, Japan
[73] Assignee: NEC Corporation, Tokyo, Japan
[21] Appl. No.: 136,612
[22] Filed: Oct. 15, 1993

Related U.S. Application Data

[63] Continuation of Ser. No. 613,028, Nov. 15, 1990.

[30] Foreign Application Priority Data

Nov. 16, 1989 [JP] Japan ................... 1-298646

[51] Int. Cl.$^5$ ............................. G06F 13/14
[52] U.S. Cl. ..................... 395/650; 364/975.1; 364/975.2; 364/976.1; 364/963.3; 364/940.81; 364/DIG. 2
[58] Field of Search ............... 395/650, 700

[56] References Cited

U.S. PATENT DOCUMENTS

4,803,623  2/1989  Klashka et al. ............... 395/275
4,914,576  4/1990  Zelley et al. ................... 395/575
5,140,685  8/1992  Sipple et al. ................... 395/600
5,274,797  12/1993  Barlow et al. ................... 395/700

*Primary Examiner*—Gareth D. Shaw
*Assistant Examiner*—John Q. Chavis
*Attorney, Agent, or Firm*—Sughrue, Mion, Zinn, Macpeak & Seas

[57] ABSTRACT

A down line-loading start control system for controlling the start of down line-loading by scanning down line-loading devices. The device ID numbers assigned to peripheral control units expected to serve as down line-loading devices are registered in a ROM (Random Access Memory) beforehand, while a down line-loading device scan table is generated by referencing a resource table. Alternatively, the device ID numbers of the peripheral control units or expected down line-loading devices may be rewritably registered in an auxiliary storage. Password checking means inhibits registered device ID number rewriting means from operating until one enters a correct password.

3 Claims, 8 Drawing Sheets

Fig. 3

IIS COMMAND

ADDRESSES

| ADDRESSEE CHANNEL NO. | COMMAND NO. | ADDRESSER CHANNEL NO. | ADDRESSEE SUBCHANNEL NO. |
|---|---|---|---|
| | 16H | 0FH | FFH, 00H |

DATA

| ID NO. | SLOT NO. | T F | REVISION |
|---|---|---|---|

DOWN LINE-LOADING START CONTROL SYSTEM

This is a continuation of application Ser. No. 07/613,028 filed Nov. 15, 1990.

BACKGROUND OF THE INVENTION

The present invention relates to a down line-loading start control system for controlling the start of down line-loading by scanning down line-loading devices.

It has been customary with conventional down line-loading start control systems to detect a down line-loading device by scanning only a limited channel number band for the purpose of reducing the scanning time. Stated another way, the channel numbers available with down line-loading devices have heretofore been confined to a limited band. So limiting the channel numbers to be assigned to down line-loading devices is undesirable since the control system would lack in adaptability. Further, in state-of-the-art miniature computers, for example, the channel numbers of peripheral control units existing in a basic cage and those of peripheral control units existing in an extension cage each lies in a different band. This poses a limitation in installation, in that the down line-loading devices would need to be confined in the basic cage without exception.

SUMMARY OF THE INVENTION

It is therefore an object of the present invention to provide a down line-loading start control system which frees the channel numbers of down line-loading devices from the band limitation by registering the device ID numbers of peripheral control units or expected down line-loading devices in a ROM (Read Only Memory) beforehand and generating a down line-loading device scan table by reference to a resource table, and reduces the scanning time by excluding peripheral control units not to execute down line-loading from the scanning operation.

It is another object of the present invention to provide a down line-loading start control system which rewritably registers the device ID numbers of peripheral control units or expected down line-loading devices in an auxiliary storage.

It is another object of the present invention to provide a down line-loading start control system which prevents unauthorized persons from changing the device ID numbers of down line-loading devices registered in an auxiliary storage.

In a data processing system of the type comprising an arithmetic and logical unit (ALU), a main storage, at least two down line-loading devices which are peripheral control devices each being connected to a host computer for executing down line-loading in response to a down line load request sent from the host computer, a system control unit having a maintenance panel and an auxiliary storage, a down line load signal line for feeding the down line load request from the host computer to the system control unit via associated one of the down line-loading devices, and a reset signal line for causing the system control unit to initialize the data processing system except for data stored in the main storage, a down line-loading start control system of the present invention has resource table generating means for issuing an input/output command to all the channel numbers on the turn-on of a power source and writes in a resource table the channel numbers and attributes of the peripheral control units having answered the input/output command. Down line-loading device scan table generating means issues an input/output command to the channel numbers of the peripheral control units having been written to the resource table by the resource table generating means, and registers in a down line-loading device scan table the channel numbers of the peripheral control units having returned device ID numbers which are registered in a line-loading device ID table stored in a ROM beforehand. Down line-loading device detecting means issues, on detecting a down line load request on the down line load signal line, an input/output command to the channel numbers of the peripheral control units having been registered in the down line-loading device scan table, thereby detecting the particular down line-loading device which has sent the down line load request. ALU starting means drives the reset signal line to reset the entire data processing system, then fetches a down line load start program from the auxiliary storage and transfers it to the main storage, then sets the leading address of the down line load start program transferred into the main storage and the channel number of the down line-loading device detected by the down line-loading device detecting means, and finally starts the ALU.

Also, in the above-stated data processing system, a down line-loading start control system of the present invention has resource table generating means for issuing an input/output command to all the channel numbers on the turn-on of a power source and writing in a resource table the channel numbers and attributes of the peripheral control units having answered the input/output command. Down line-loading device scan table generating means issues an input/output command to the channel numbers of the peripheral control units having been written to the resource table by the resource table generating means, and registers in a down line-loading device scan table the channel numbers of the peripheral control units having returned device ID numbers which are registered in a down line-loading device ID table stored in the auxiliary storage beforehand. Down line-loading device detecting means issues, on detecting a down line load request on the down line load signal line, an input/output command to the channel numbers of the peripheral control units having been registered in the down line-loading device scan table, thereby detecting the particular down line-loading device which has sent the down line load request. ALU starting means drives the reset signal line to reset the entire data processing system, then fetches a down line load start program from the auxiliary storage and transfers it to the main storage, then sets the leading address of the down line load start program transferred into the main storage and the channel number of the down line-loading device detected by the down line-loading device detecting means, and then starts the ALU. Registered device ID number rewriting means is responsive to a command from the maintenance panel for rewriting the ID numbers of the down line-loading device ID table stored in the auxiliary storage. Further, in the above-stated data processing system, a down line-loading start control system of the present invention has resource table generating means for issuing an input/output command to all the channel numbers on the turn-on of a power source and writing in a resource table the channel numbers and attributes of the peripheral control units having answered the input/output command. Down line-loading device scan table generating means issues an input/output command to the channel numbers of the peripheral control units having been written to the resource table by the resource table generating means, and registers in a down line-loading device scan table the channel numbers of the peripheral control units having returned device ID numbers which are registered in a down line-loading device ID table stored in the auxiliary storage beforehand. Down line-loading device detecting means issues, in detecting a down line load request on the down line load signal line, an input/output command to the channel numbers of the peripheral control units having been registered in the down line-loading device scan table, thereby detecting the particular down line-loading device which has sent the down line load request. ALU starting means drives the reset signal line to reset the entire data processing system, then fetches a down line load start program from the auxiliary storage and transfers it to the main storage, then sets the leading address of the down line load start program transferred into the main storage and the channel number of the down line-loading device detected by the down line-loading device detecting means, and then starts the ALU. Registered device ID number rewriting means is responsive to a command from the maintenance panel for rewriting the ID numbers of the down line-loading device ID table stored in the auxiliary storage. Password checking means allows the registered device ID number rewriting means to be used only when a password is inputted on the maintenence panel.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
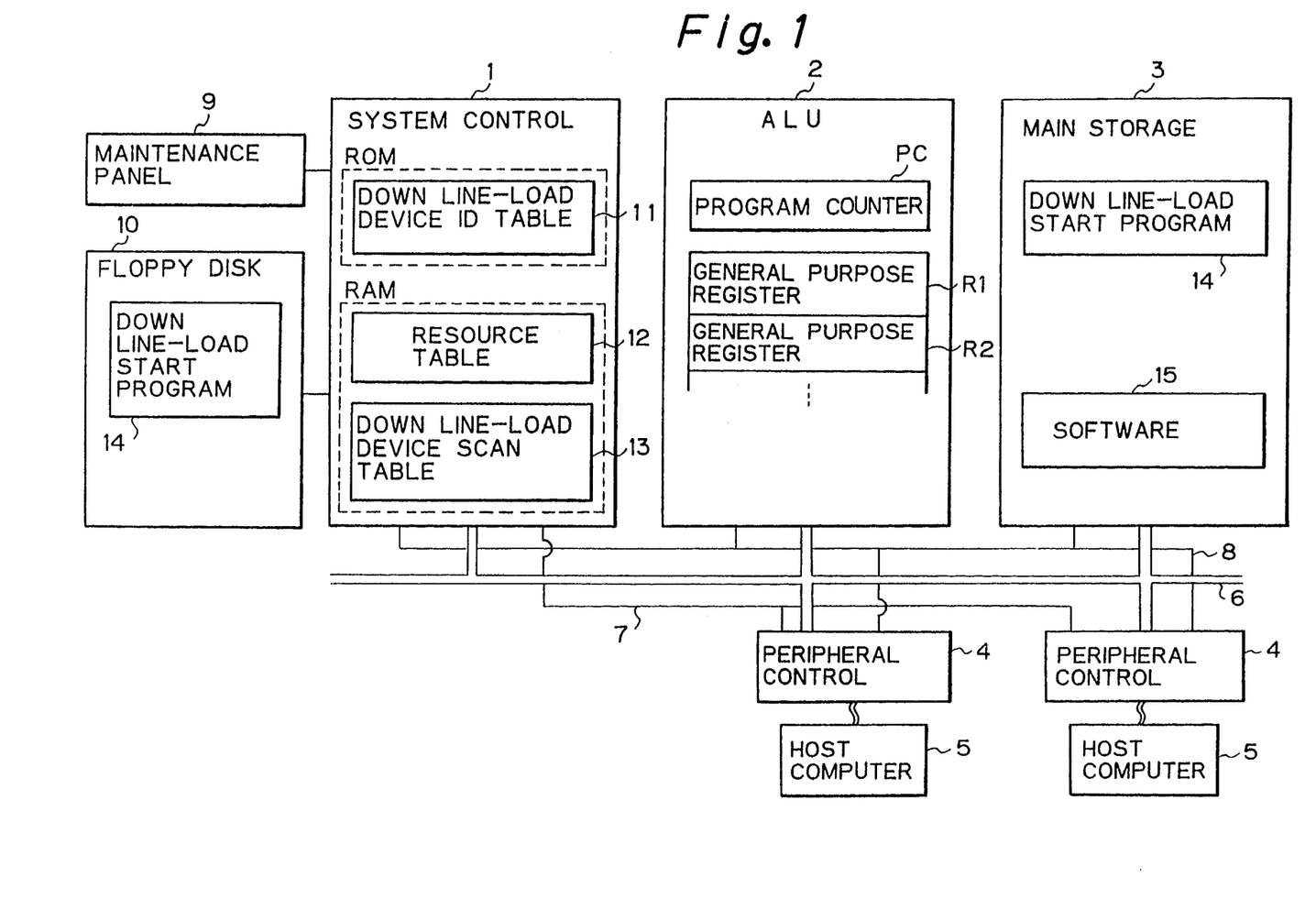
FIG. 1 is a block diagram schematically showing a data processing system to which a down line-loading start control system embodying the present invention is applied.

Referring to FIG. 1 of the drawings, a data processing system to which a down line-loading start control system embodying the present invention is applied is shown. As shown, the data processing system includes a system control unit 1, an arithmetic and logical unit (ALU) 2, a main storage 3, and a plurality of (two in the illustrative embodiment) peripheral control units 4. A plurality of host computers 5 each is connected to respective one of the peripheral control units 4. The system control unit 1, ALU 2, main storage 3 and peripheral control units 4 are connected together by a bus 6. The system control unit 1 and peripheral control units 4 are connected by a down line load signal line 7. Further, the ALU 2, main storage 3 and peripheral control units 4 are connected to the system control unit 1 by a reset signal line 8. A maintenance panel 9 and a floppy disk unit 10 which serves as an auxiliary storage are associated with the system control unit 1.

The system control unit 1 has a ROM (Read Only Memory) and a RAM (Random Access Memory). The ROM stores a down line-loading device identification (ID) table 11, and the RAM Stores a resource table 12 and a down line-loading device scan table 13. The ALU 2 has a program counter PC and general purpose registers R1 and R2. A down line load start program 14 and software 15 which is to be down line-loaded from any of the host computers 5 may be transferred into the main storage 3. The floppy disk unit 10 stores the down line load start program 14.

Figure 2:
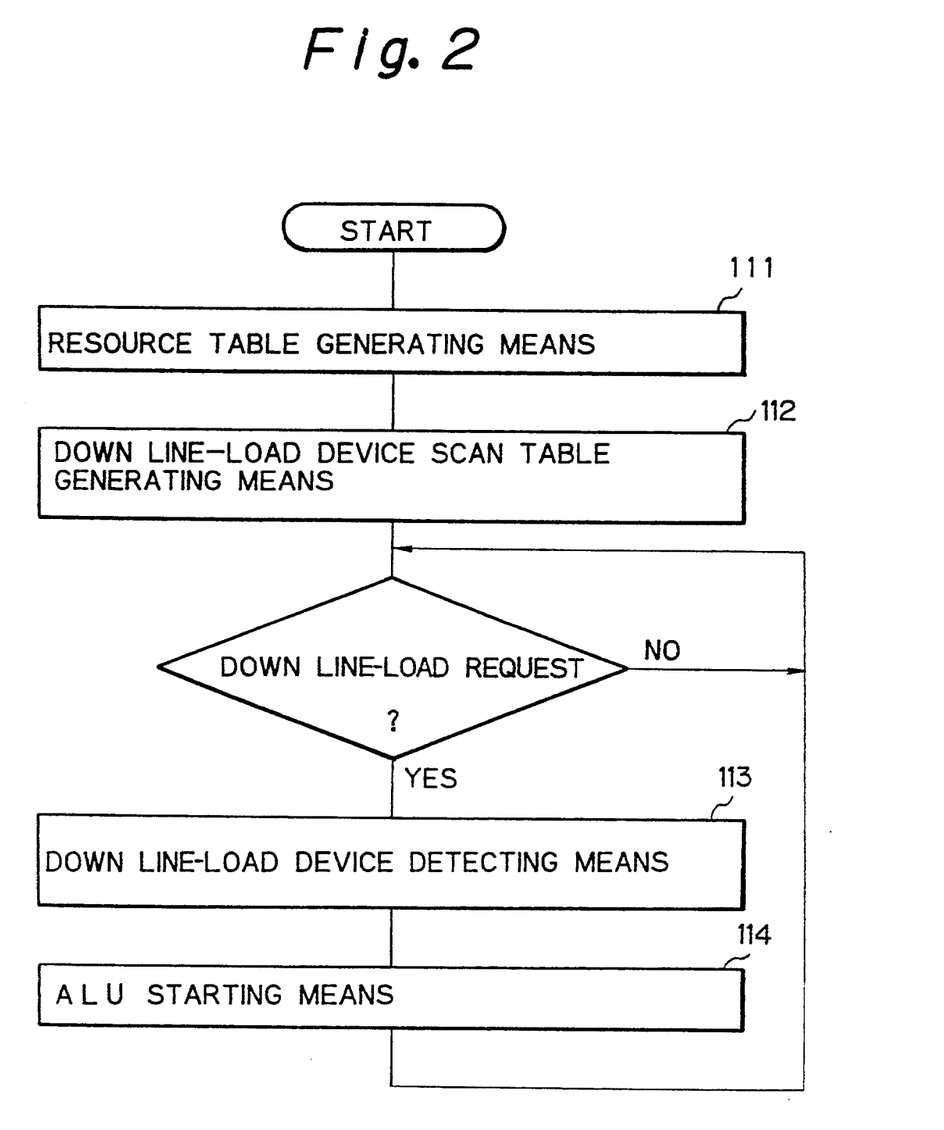
FIG. 2 is a flowchart representative of various means included in a system control unit of the illustrative embodiment.

As shown in FIG. 2, the system control unit 1 has resource table generating means 111, down line-loading device scan table generating means 112, down line-loading device detecting means 113, and ALU starting means 114.

Figure 3:
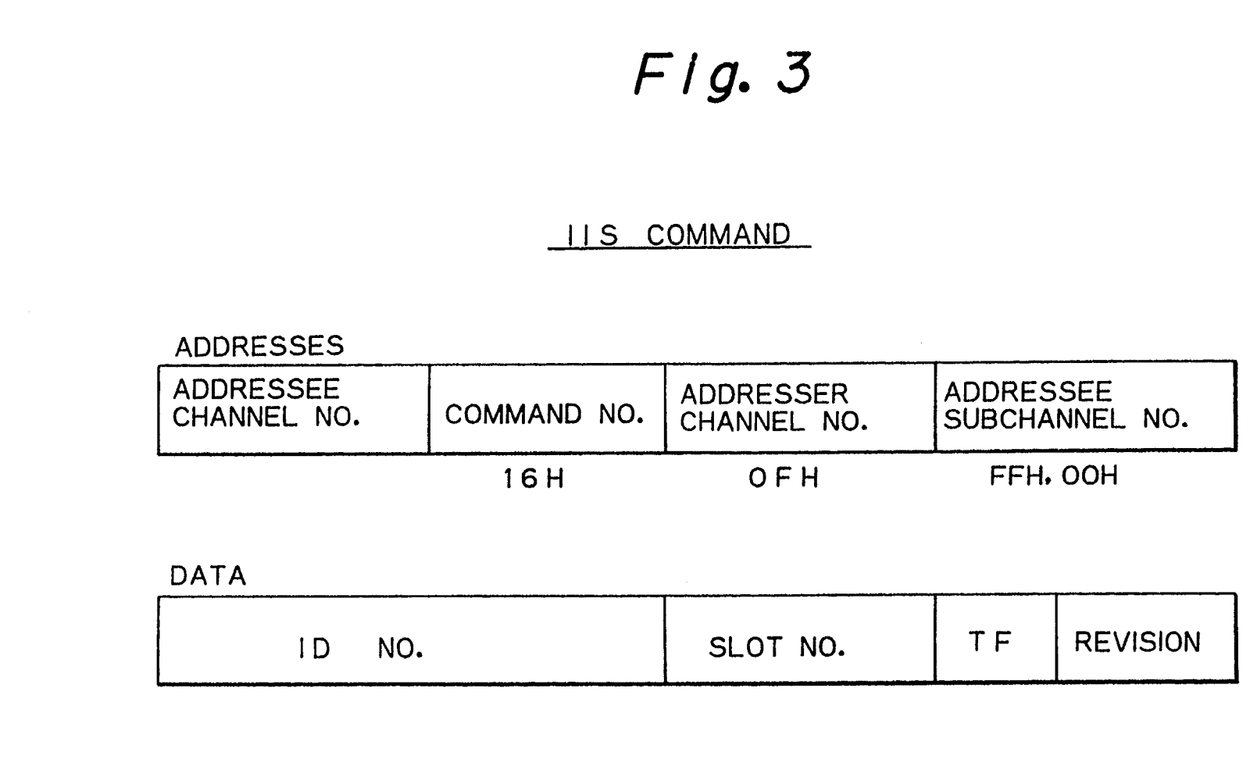
FIG. 3 shows the format of an IIS command to be issued by the system control unit of the embodiment.

FIG. 3 shows the addresses of an IIS (Input Initial Status) command which the system control unit 1 issues. As shown, the addresses, i.e., the contents of the IIS command are made up of an addressee channel number, a command number, an addresser channel number, and an addressee subchannel number. 255 different addressee channel numbers, i.e., "00" to "FFH" are available except for the channel number "0FH" assigned to the system control unit 1. Here, "H" is representative of a hexadecimal notation, and this is true throughout the description. The command number "16H" is representative of the IIS command. The addresser channel number is the channel number "0FH" assigned to the system control unit 1. The addressee subchannel number is "FFH" in the event of generating the resource table 12 and "00H" in the event of generating the down line-loading device scan table 13. In response to the IIS command, the peripheral control units 4 each returns data consisting of an ID number, a slot number, TF (Test Firmware), and a revision of TF. While the ID number is predetermined on a subscannel basis, the ID number assigned to the subchannel number "FFH" is generally referred to as a package ID number and particular to a package. That the package ID numbers are identical is considered to mean that the hardware is identical. On the other hand, the ID number assigned to the subchannel number "00H" is referred to as a device ID number and represents the function of a particular peripheral control unit 4. For example, assuming the peripheral control units 4 are connected to the same host computer 5, the device ID number differs from the unit that executes down line-loading to another that does not execute it.

Figure 4:
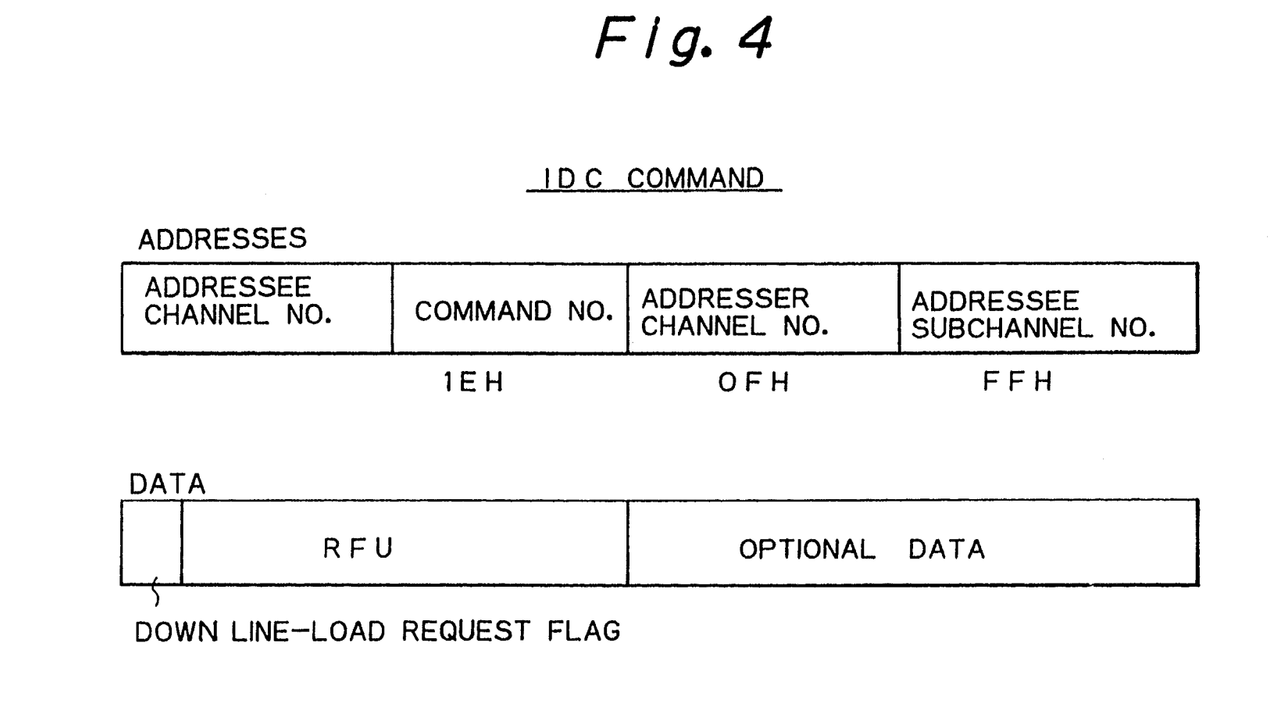
FIG. 4 shows the format of an IDC command to be issued by the system control unit of the embodiment.

FIG. 4 shows the addresses of an IDC (Input DLL (Down Line Load) Control) command to be issued by the system control unit 1. As shown, the addresses or contents of the IDC command consists of an addressee channel number, a command number, an addresser channel number, and an addressee subchannel number. The command number "1EH" is representative of the IDC command. Data which each peripheral control unit 4 returns in response to the IDC command is made up of a down line load request flag, RFU (Reserved for Future Use), and optional data including a station address.

Figure 5:
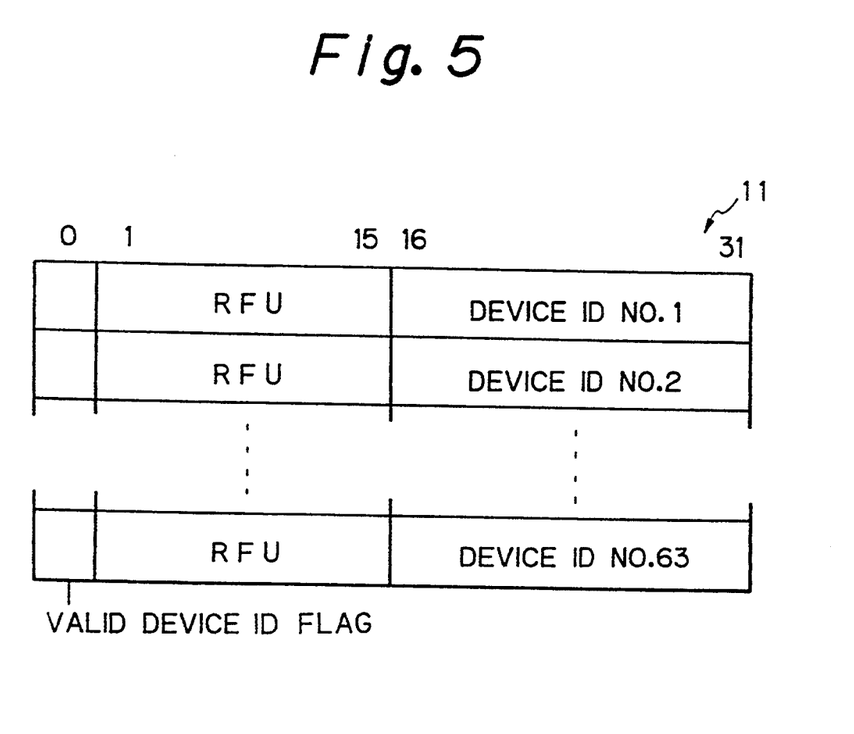
FIG. 5 shows a down line load device ID table of the embodiment.

As shown in FIG. 5, the down line-loading device ID table 11 is implemented with a plurality of entries which are constituted by valid device ID flags, RFUs, and device ID numbers.

Figure 6:
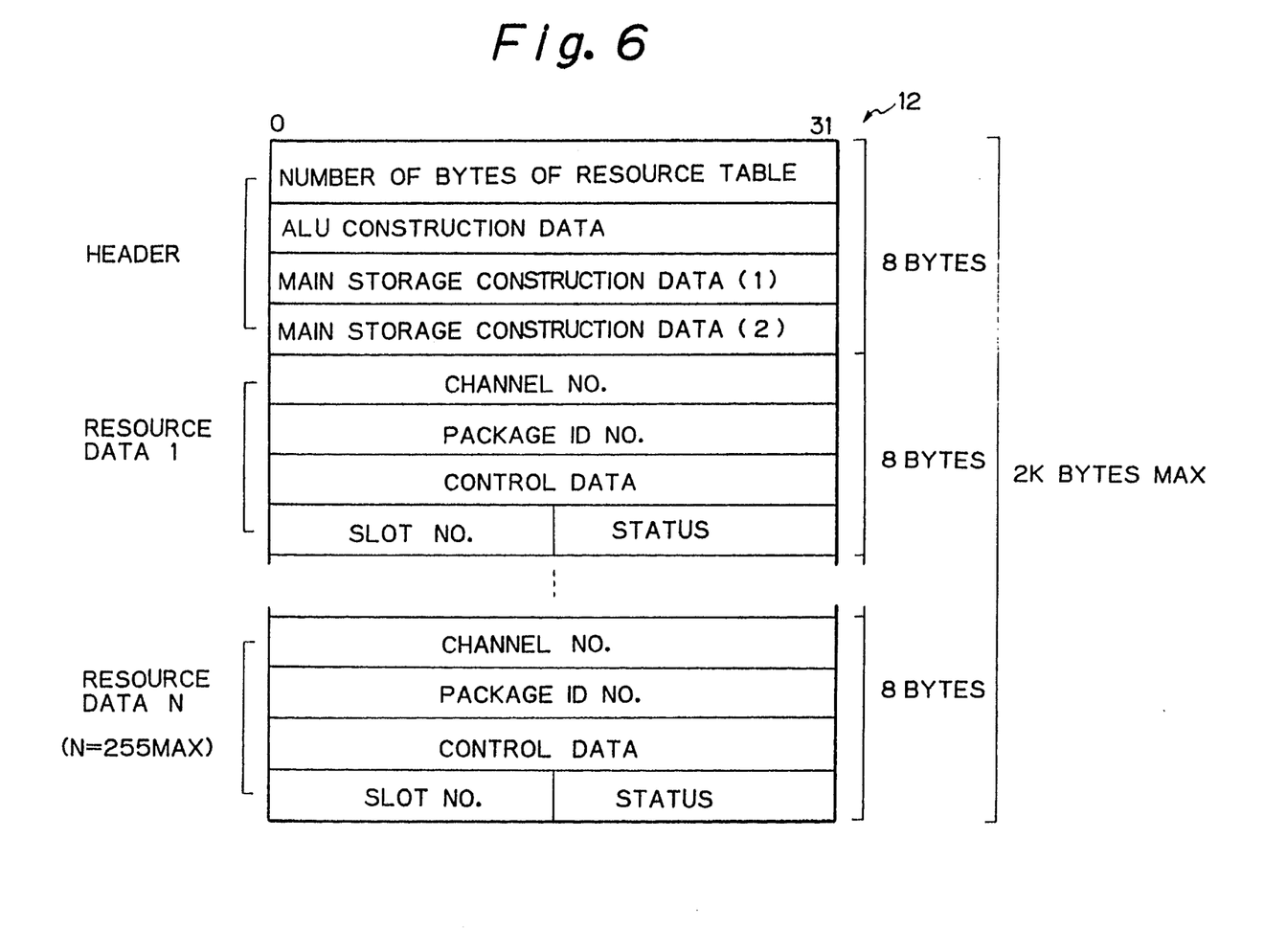
FIG. 6 shows a resource table of the illustrative embodiment.

As shown in FIG. 6, the resource table 12 has a header made up of the number of bytes of the resource table, ALU construction data, and main storage construction data, and a plurality of resource data each being made up of a channel number, a package ID number, control data, a slot number, and a status (TF and revision).

Figure 7:
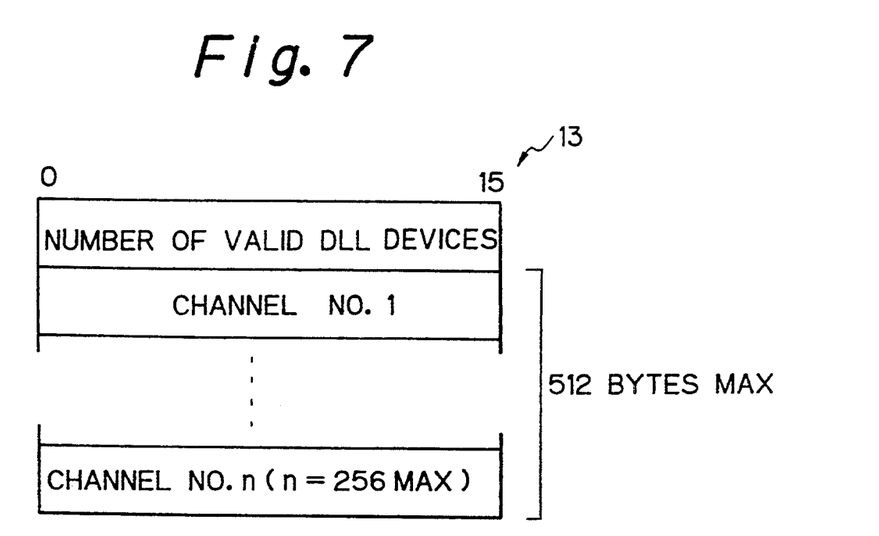
FIG. 7 shows a down line-loading device scan table of the embodiment.

FIG. 7 shows the down line-loading device scan table 13. As shown, the table 13 has the number of valid down line-loading devices and a plurality of channel numbers.

In operation, when the power source of the system is turned on, the system control unit 1 causes the resource table generating means 111 thereof to issue an IIS command to all the channel numbers including those of the ALU 2, main storage 3 and peripheral control units 4 by use of the subchannel number "FFH". The system control unit 1 determines that resources exist in the periphral control units 4 with the channel numbers which have returned data thereto in response to the IIS command. Then, the system control unit 1 writes the channel numbers, package ID numbers, slot numbers, statuses (TF and revision) and other resource data associated with such answered peripheral control units 4 in the RAM to generate a resource table 12.

Subsequently, the system control unit 1 causes the down line-loading device scan table generating means 112 to issue an IIS command to the channel numbers of the peripheral control units 4 having been written to the resource table 12, by use of the channel number "00H". By using the down line load scan table generating means 112, the system control unit 1 compares ID numbers (device ID numbers) contained in data returned from the peripheral control units 4 with the device ID numbers which are registered in the down line-loading device ID table 11 beforehand. If the ID numbers contained in the data from the peripheral control units 4 and the registered device ID numbers compare equal, the system control unit 1 writes the channel numbers of such qualified units 4 in the RAM to produce a down line-loading device scan table 13.

Assume that one of the qualified peripheral control units 4 has received a down line load request from the associated host computer 5 after the generation of the resource table 12 and down line-loading device scan table 13. Then, the peripheral control unit 4 drives the down line load signal line 7 to inform the system control unit 1 of the occurrence of a down line load request. On confirming the down line load request, the system control unit 1 causes the down line-loading device detecting means 113 thereof to issue an IDC command to the peripheral control units 4 whose channel numbers have been written to the down line-loading device scan table 13 and, on the basis of a down line load request flag included in returned data, to detect the peripheral control unit 4 that has sent the down line load request.

After the system control unit 1 has detected which peripheral control unit 4 sent the down line load request as started above, it causes the ALU starting means 114 to drive the reset signal line 8 and thereby initializes the data processing system. Subsequently, the system control unit 1 fetches the down line load start program 14 from the floppy disk unit 10 and transfers it to the main strorage 3. The leading address of the down line load start program 14 transferred to the main storage 3 is set in the program counter PC of the ALU 2, while the channel number and optional data particular to the peripheral control unit 4 of interest are written to the general purpose registers R1 and R2, respectively. Thereafter, the system control unit 1 starts the ALU 2 by the ALU starting means 114.

By the above procedure, the down line load start program 14 is started with the result that software 15 is down-loaded from the host computer 5 to the main storage 3 via the peripheral control unit or down line-loading device 4.

Figure 8:
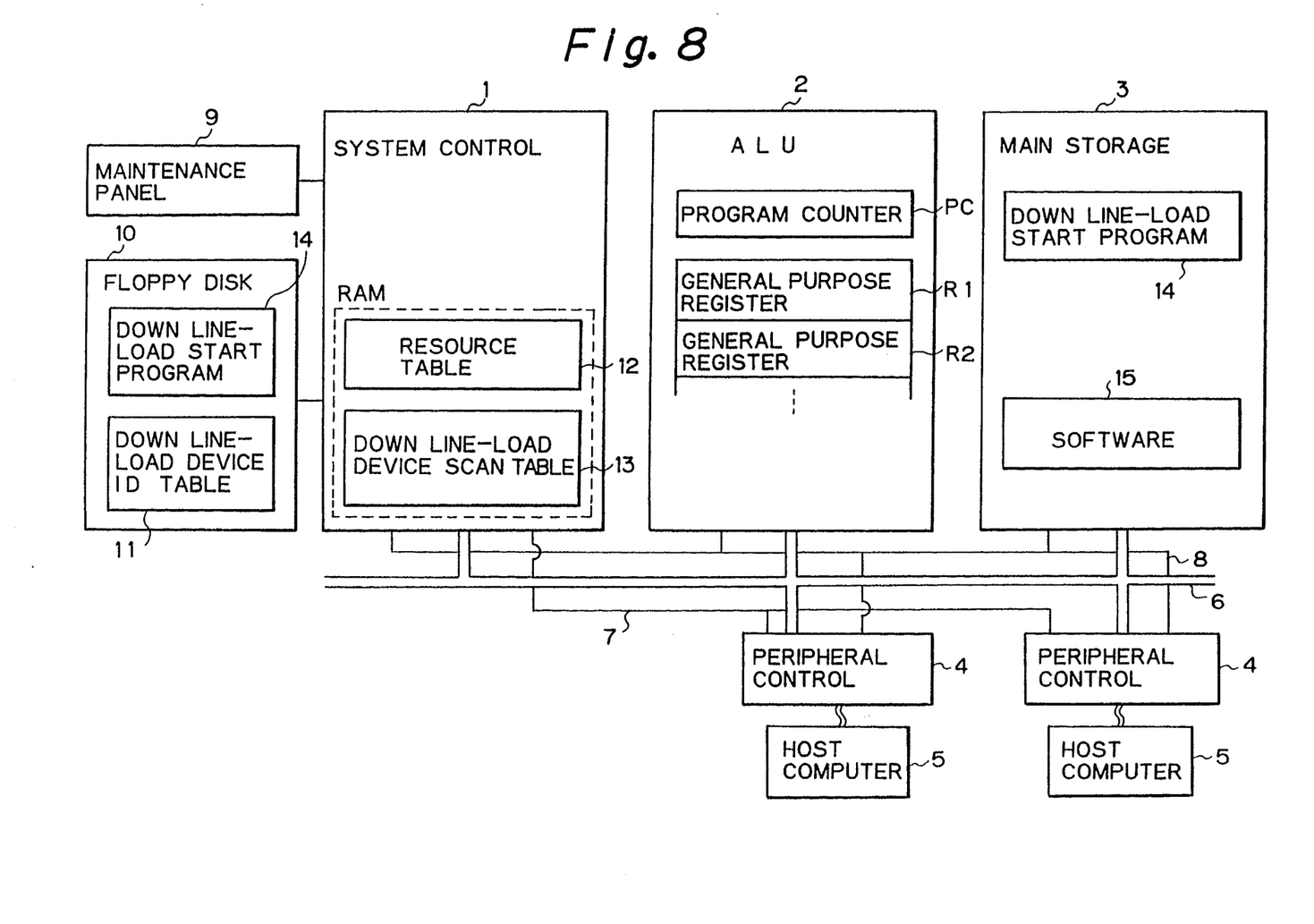
FIG. 8 is a block diagram schematically showing a data processing system to which an alternative embodiment of the present invention is applied.
Figure 9:
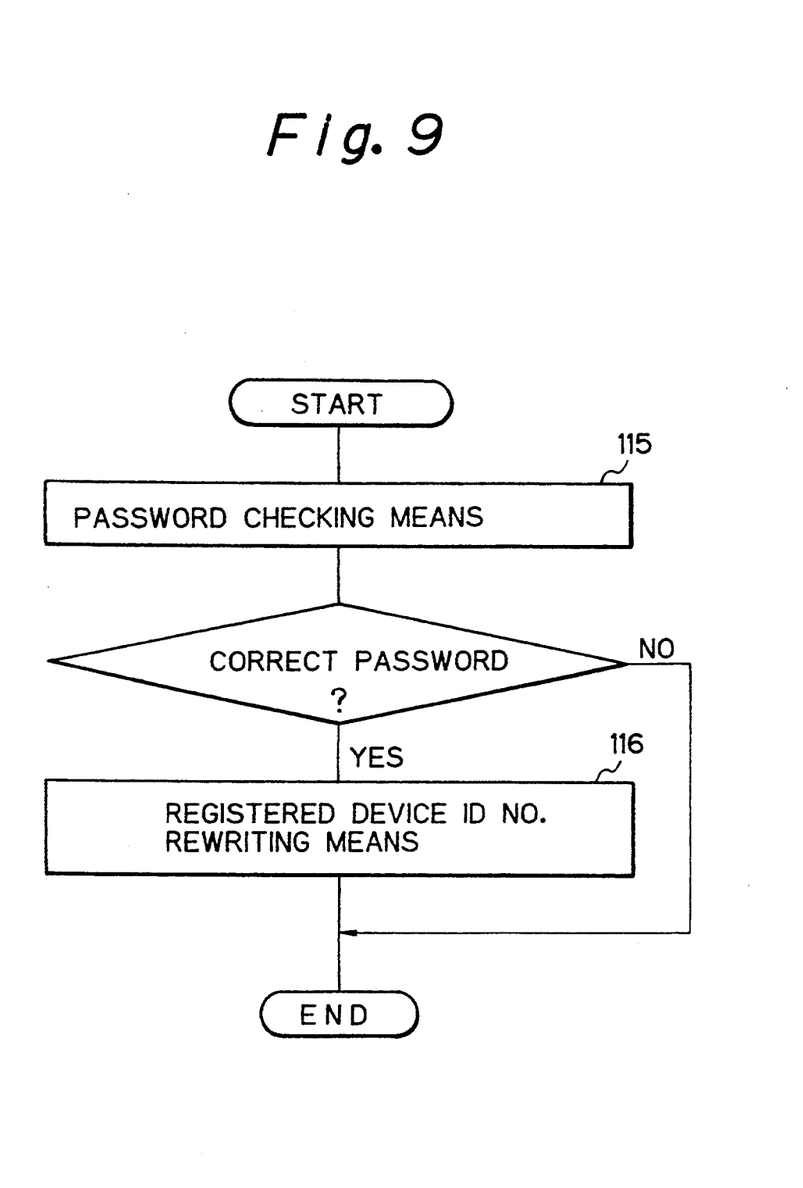
FIG. 9 is a flowchart representative of various means included in a system control of the alternative embodiment.

Referring to FIG. 8, a data processing system implemented with an alternative embodiment of the present invention is shown. While the previous embodiment stores the down line-loading device ID table 11 permanently in the ROM of the system control unit 1, the alternative embodiment stores it rewritably in the floppy disk unit 10. As shown in FIG. 9, the system control unit 1 of this embodiment additionally has password checking means 115 and registered device ID number rewriting means 116.

As stated above, the alternative embodiment stores the down line-loading device ID table 11 in the floppy disk unit 10. This allows the registered device ID number rewriting means 116 to change the device ID numbers registered in the down line-loading device ID table 11 in response to a command entered on the maintenance panel 9. It is possible, therefore, to register the device ID numbers of new peripheral control units 4 expected to execute down line-loading in the down line-loading device ID table 11, to delete the device ID numbers of the peripheral control units 4 not expected to do so registered in the ID table 11, or to rewrite the device ID numbers of the peripheral control units 4 to execute down line-loading in the table 11.

Regarding the maintenance panel 9, not only servicemen but also system engineers and ordinary users have access thereto. Should the device ID numbers registered in the down line-loading device ID table 11 be erroneously changed, the entire data processing system would be seriously effected. In the illustrative embodiment, the password checking means 115 inhibits the registered device ID number rewriting means 116 from operating until a correct password has been inputted. This is successful in preventing unauthorized persons from changing the registered device ID numbers assigned to the down line-loading devices, whereby the data processing system is free from critical disturbances.

In summary, in accordance with the present invention, the device ID numbers assigned to peripheral control units expected to serve as down line-loading devices are registered in a ROM beforehand, while a down line-loading device scan table is generated by referencing a resource table. Hence, it is not necessary to confine the channel numbers of down line-loading devices in a limited band, i.e., the devices are free from limitations otherwise posed by the channel numbers in the installation aspect. Regarding peripheral control units which do not execute down line-loading although connected to host computers, their device ID numbers are not registered and are excluded from the scanning operation, whereby the down line-loading device scanning time is reduced.

The device ID numbers of peripheral control units to execute down line-loading are rewritably registered in an auxiliary storage. Hence, the device ID numbers to execute down line-loading can be changed in response to a command which may be entered on a maintenance panel.

Further, password checking means inhibits registered device ID number rewriting means from operating until a correct password has been inputted. This prevents unauthorized persons from changing the registered device ID numbers and thereby safeguards the data processing system from disturbances.

Various modifications will become possible for those skilled in the art after receiving the teachings of the present disclosure without departing from the scope thereof.

What is claimed is:

1. A down line-loading start control system for a data processing system, said data processing system including an arithmetic and logical unit (ALU), a main storage, at least two down line-loading devices which are peripheral control units having channel numbers, each of said peripheral control units being respectively connected to a host computer for loading software from said host computer to said main storage in response to a down line load request sent from said host computer, a system control unit having a maintenance panel and an auxiliary storage, a down line load signal line for feeding said down line load request from said host computer to said system control unit via associated one of said down line-loading devices, and a reset signal line for causing said system control unit to initialize said data processing system except for data stored in said main storage, said control system comprising:

resource table generating means for issuing an input-/output command to all channel numbers on the turn-on of a power source and writing in a resource table the channel numbers and attributes of the peripheral control units having answered said input/output command:

down line-loading device scan table generating means for issuing an input/output command to said channel numbers of said peripheral control units having been written to said resource table by said resource table generating means, and registering in a down line-loading device scan table the channel numbers of the peripheral control units having returned device ID numbers which are registered in a down line-loading device ID table stored in a ROM of said system control unit beforehand:

down line-loading device detecting means for issuing, on detecting a down line load request on the down line load signal line, an input/output command to said channel numbers of said peripheral control units having been registered in said down line-loading device scan table, thereby detecting which of the down line-loading devices has sent said down line load request; and ALU starting means for resetting said entire data processing system via the reset signal line, then fetching a down line load start program from the auxiliary storage and transferring said program to the main storage, then setting a leading address of said down line load start program transferred to said main storage in a program counter of said ALU, setting said channel number of said down line-loading device detected by said down line-loading device detecting means in a general purpose register of said ALU, and then starting the ALU, thereby causing said ALU to start executing said down line load start program to thereby load said software from said host computer.

2. A down line-loading start control system for a data processing system, said data processing system including an ALU, a main storage, at least two down line-loading device which are peripheral control units having channel numbers, each of said peripheral control units being respectively connected to a host computer for loading software from said host computer to said main storage in response to a down line load request sent from said host computer, a system control unit having a maintenance panel and an auxiliary storage, a down line load signal line for feeding said down line load request from said host computer to said system control unit via associated one of said down line-loading devices, and a reset signal line for causing said system control unit to initialize said entire data processing system except for data stored in said main storage, said control system comprising:

resource table generating means for issuing an input-/output command to all channel numbers on the turn-on of a power source and writing in a resource table the channel numbers and attributes of the peripheral control units having answered said input/output command;

down line-loading device scan table generating means for issuing an input/output command to said channel numbers of said peripheral control units having been written to said resource table by said resource table generating means, and registering in a down line-loading device scan table the channel numbers of the peripheral control units having returned device ID numbers which are registered in a down line-loading device ID table stored in the auxiliary storage beforehand;

down line-loading device detecting means for issuing, on detecting a down line load request on the down line load signal line, an input/output command to said channel numbers of said peripheral control units having been registered in said down line-loading device scan table, thereby detecting which of the down line-loading devices has sent said down line load request;

ALU starting means for resetting said entire date processing system via the reset signal line, then fetching a down line load start program from the auxiliary storage and transferring said program to the main storage, then setting a leading address of said down line load start program transferred to said main storage in a program counter of said ALU, setting said channel number of said down line-loading device detected by said down line-loading device detecting means in a general purpose register of said ALU, and then starting the ALU, thereby causing said ALU to start executing said down line load start program to thereby load said software from said host computer; and registered device ID number rewriting means responsive to a command from the maintenance panel for rewriting said ID numbers of said down line-loading device ID table stored in the auxiliary storage.

3. A down line-loading start control system for a data processing system, said data processing system including an ALU, a main storage, at least two down line-loading device which are peripheral control units having channel numbers, each of said peripheral control units being respectively connected to a host computer for loading software from said host computer to said main storage in response to a down line load request sent from said host computer, a system control unit having a maintenance panel and an auxiliary storage, a down line load signal line for feeding said down line load request from said host computer to said system control unit via associated one of said down line-loading devices, and a reset signal line for causing said system control unit to initialize said entire data processing system except for data stored in said main storage, said control system comprising:

resource table generating means for issuing an input/output command to all channel numbers on the turn-on of a power source and writing in a resource table the channel numbers and attributes of the peripheral control units having answered said input/output command;

down line-loading device scan table generating means for issuing an input/output command to said channel numbers of said peripheral control units having been written to said resource table by said resource table generating means, and registering in a down line-loading device scan table the channel numbers of the peripheral control units having returned device ID numbers which are registered in a down line-loading device ID table stored in the auxiliary storage beforehand;

down line-loading device detecting means for issuing, on detecting a down line load request on the down line load signal line, an input/output command to said channel numbers of said peripheral control units having been registered in said down line-loading device scan table, thereby detecting which of the down line-loading devices has sent said down line load request;

ALU starting means for resetting said entire date processing system via the reset signal line, then fetching a down line load start program from the auxiliary storage and transferring said program to the main storage, then setting a leading address of said down line load start program transferred to said main storage in a program counter of said ALU, setting said channel number of said down line-loading device detected by said down line-loading device detecting means in a general purpose register of said ALU, and then starting the ALU, thereby causing said ALU to start executing said down line load start program to thereby load said software from said host computer; and registered device ID number rewriting means responsive to a command from the maintenance panel for rewriting said ID numbers of said down line-loading device ID table stored in the auxiliary storage; and password checking means for allowing said registered device ID number rewriting means to be used only when a password is inputted on the maintenance panel.

* * * * *